Figure 1:
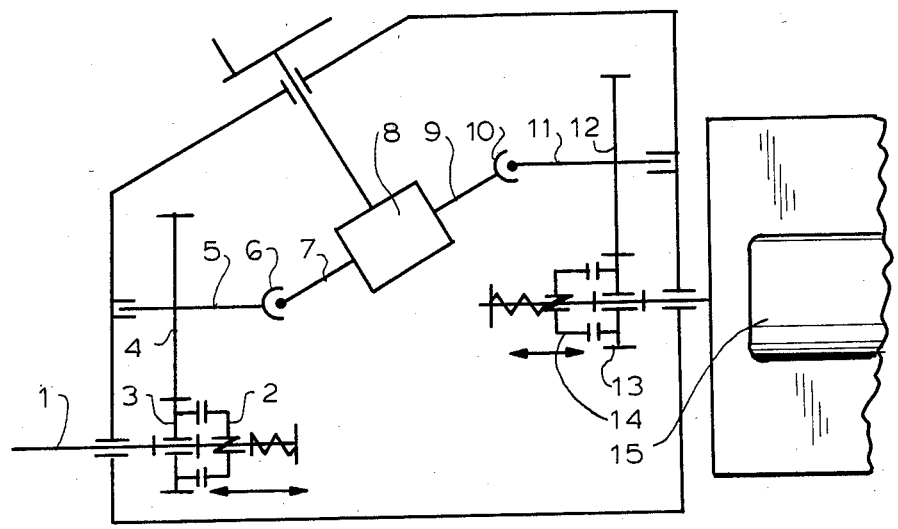

United States Patent [19]

Jung et al.

[11] Patent Number: 4,583,412
[45] Date of Patent: Apr. 22, 1986

[54] UNIVERSAL JOINT ARRANGEMENT FOR FORMING A VARIABLE-VELOCITY DRIVE FOR DRIVING A WINDOW CUTTER ROLLER OF AN ENVELOPE MACHINE

[75] Inventors: Jürgen Jung, Bendorf; Gerd Ruttert, Neuwied, both of Fed. Rep. of Germany

[73] Assignee: Winkler & Dunnebier Maschinenfabrik und Eisengiesserei GmbH & Co. KG, Neuwied, Fed. Rep. of Germany

[21] Appl. No.: 626,212

[22] Filed: Jun. 29, 1984

[30] Foreign Application Priority Data

Jun. 30, 1983 [DE] Fed. Rep. of Germany ....... 3323512

[51] Int. Cl.$^4$ .................. F16H 35/02; F16H 21/40; F16H 21/52; B23D 25/02
[52] U.S. Cl. ........................................ 74/393; 74/63; 83/311
[58] Field of Search ............... 74/393, 63; 493/919; 83/324, 593, 311, 911

[56] References Cited

U.S. PATENT DOCUMENTS

| | | | |
|---|---|---|---|
| 1,865,839 | 7/1932 | Craig | 74/63 |
| 2,764,033 | 9/1956 | Lane | 74/393 |
| 3,475,976 | 11/1969 | Steinke | 74/63 |
| 3,593,607 | 7/1971 | Munchbach | 83/311 |
| 4,130,039 | 12/1978 | Heyden et al. | 83/356.3 |
| 4,414,873 | 11/1983 | Besemann et al. | 83/311 |

FOREIGN PATENT DOCUMENTS

| | | | |
|---|---|---|---|
| 699285 | 12/1964 | Canada | 74/63 |
| 1420952 | 1/1976 | United Kingdom | |

*Primary Examiner*—Lawrence J. Staab
*Assistant Examiner*—Michael D. Bednarek
*Attorney, Agent, or Firm*—Collard, Roe & Galgano

[57] ABSTRACT

A variable-velocity drive is provided which serves to so control the peripheral velocity of a window cutter roller in an envelope machine working from the reel that, irrespective of the developed length of such roller, the velocity of the window cutter is the same as that of the paper web for the time that such cutter is operative on such web. To this end, the variable-velocity drive is basically devised from a number of universal joints interconnecting shafts whose axes intersect one another at an angle of up to approximately 45°; the universal joints are so offset from one another in rotation that the variations or irregularities arising in the discrete joints are superimposed upon one another so as to have an amplifying effect. Since any one such universal joint arrangement passes through two velocity maxima and two velocity minima per revolution, gearing is provided on the input and output side to make the universal joint arrangement run at half the cycle speed.

1 Claim, 2 Drawing Figures

UNIVERSAL JOINT ARRANGEMENT FOR FORMING A VARIABLE-VELOCITY DRIVE FOR DRIVING A WINDOW CUTTER ROLLER OF AN ENVELOPE MACHINE

The present invention relates to a universal joint arrangement for forming a variable-velocity drive. More particularly, the present invention relates to such an arrangement for driving a window cutter roller of an envelope machine working from the reel.

In machines of this kind the window-cutting facility runs of course in timed fashion—i.e., the window cutter roller rotates through one revolution per finished envelope irrespective of envelope dimensions. To obviate slip between the generated surface of the window cutter roller and the paper web, a roller of appropriate developed length must be available for each format size to be dealt with.

However, this slip is a real disturbance only in that angular range of the roller in which the cutter is in engagement with the paper web. More particularly, the slip then causes dimensional distortions in window height—i.e., the window openings punched into the paper web do not correspond in height to the dimensions of the window cutter. As slip increases, so do not only the dimensional distortions but also cutter wear, such wear rapidly becoming excessive. Further increases in slip may cause the web to tear.

Endeavors have therefore been made to so control the angular velocity of the window cutter roller during each single revolution that, despite the presence of a discrepancy in developed length, the peripheral velocity of the cutter is substantially that of the paper web while the cutter is acting thereon. To this end, a so-called variable-velocity drive is incorporated in the cutter roller drive train.

Known drives used for this purpose recall by their construction a crank drive, the crank arm engaging in a slide block which moves towards the crank center and away therefrom during the revolution of the crank. Consequently, and as is necessary for the case described, the drive outputs a varying peripheral velocity at a constant average speed (in revolutions per minute).

Unfortunately, there are considerable disadvantages in producing the variable-velocity effect by means of a slide block reciprocated in guides. The main disadvantage is the reduced power which can be transmitted, so that transmissions of this kind are of use only at relatively low speeds and at relatively low amounts of irregularity.

Modern envelope machines run at speeds of about twice the permissible speeds of the variable-velocity transmissions described.

Another requirement is that two or at most three window cutter rollers should be able to cover the complete range of adjustment of such machines. The known variable-velocity drives do not meet these requirements.

It is, therefore, an object of the present invention to provide a variable-velocity drive, more particularly, to drive a window cutter roller of an envelope machine, which is devoid of slide block and enables a wide range of variable velocity to be provided at high speeds.

According to the invention, therefore, the universal joint arrangement comprises at least one universal joint interconnecting two shafts whose axes intersect one another at an angle $\gamma$; and gearwheel pairs which provide a ratio stepdown and a ratio stepup respectively are provided to make the universal joint arrangement run at half the speed of the window cutter roller.

The advantage provided by this feature is obviation of a reciprocating slide block with its concomitant limitations on speed and power transmission.

In an advantageous development of the invention, a number of universal joints are arranged one after another. This feature not only increases the irregularity which can be provided but also and more particularly it enables output and input shafts to be arranged in alignment with one another. Such an arrangement also makes it possible to have simple adjustment of the amount of irregularity or variation.

Other objects and features of the present invention will become apparent from the following detailed description considered in connection with the accompanying drawing. It is to be understood, however, that the drawing is designed as an illustration only and not as a definition of the limits of the invention.

Figure 2:
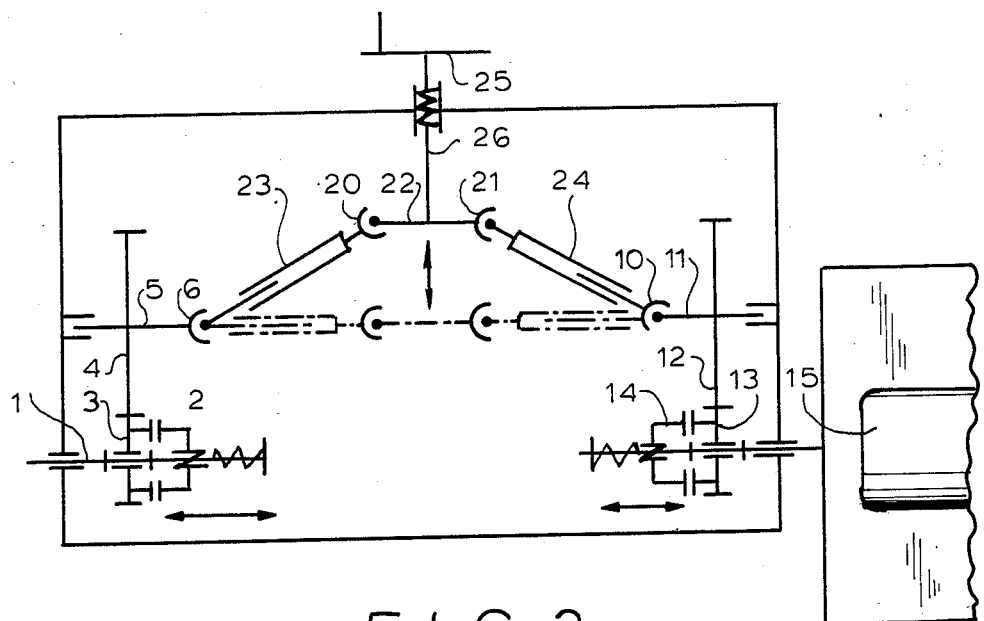

In the drawing wherein similar reference characters denote similar elements throughout the several views:

FIG. 1 is a schematic representation of a variable-velocity drive embodied by two universal joints, adjustment of the extent of variation or irregularity being effected by rotating the joints relatively to one another; and FIG. 2 is a schematic representation of a variable-velocity drive embodied by four universal joints, the amount of variation or irregularity being adjusted by adjustment of the bend angles $\gamma$.

Now turning to the drawing, there is shown in FIG. 1 a simple embodiment of the variable-velocity drive according to the present invention. The drive mainly comprises an input shaft 1 driving through a clutch 2 a gear 3 meshing with another gear 4 having twice the number of teeth of the gear 3. Gear 4 is disposed on a shaft 5 which by way of a universal joint 6, drives a shaft 7 which in turn drives a shaft 9 by way of a kind of differential transmission 8. Shaft 9 terminates in a second universal joint 10 which drives a shaft 11 which is disposed at the bend angle $\gamma$ to the shaft 9 and on which a gear 12 is secured for co-rotation. Gear 12 meshes with a gear 13 having half the number of teeth as gear 12. The drive to a window cutter roller 15 is by way of a clutch 14.

The operation of the drive whose components have been described so far will become understandable when the universal joints 6 and 10 are considered. If the shafts 7 and 9 together with the differential 8 are regarded as an "intermediate shaft", it will be apparent that the forks of the universal joints disposed on this "intermediate shaft" are at an offset of 90° from one another. This arranement, which conventional rules of assembly regard as "wrong", leads to the irregularities arising in the universal joints 6 and 10 all being superimposed upon one another and, therefore, to the maximum possible degree of irregularity or velocity variation of the output shaft and, therefore, of the roller 15 of which this drive is capable. On the assumption that the input shaft 1 runs at a uniform angular velocity $\omega_1$, the angular velocity $\omega_{15}$ of the output shaft varies between the extremes:

$$\omega_{15} = \omega_1 \cdot \cos^2\gamma \text{ and } \omega_{15} = \omega_1 \frac{1}{\cos^2\gamma}$$

Through the agency of the differential 8 the forks of the universal joints 6 and 10 on the "intermediate shaft" can be varied from the 90° offset position of FIG. 1 to coplanarity. In this case the superimpositioning of the irregularites emanating from the joints 6 and 10 results in compensation—i.e., the resulting degree of irregularity drops to zero. Of course any intermediate position and, therefore, any intermediate value of irregularity is possible between these two end positions.

Of course the angular velocity of a universal shaft varies twice sinusoidally per revolution between a maximum and a minimum. However, the window cutter roller 15 must reach only one maximum or minimum peripheral velocity in each revolution. This is the reason for the presence of the gear pairs 3, 4 and 12, 13, the effect of which is that the universal joints 6 and 10 run at half the speed of the shaft 15 and input shaft 1—i.e., they perform only half a revolution during one complete revolution of the roller 15.

As previously stated, a single window cutter roller is required to cover a very wide range of format developments. This means that formats smaller and larger than which correspond to the developed length of the roller are produced. Consequently, the variable-velocity or irregularity drive must be able to so control the window cutter that the same reaches either its maximum speed or its minimum speed, depending upon the format size it is required to produce, in the time that the cutter acts on the paper web. One possible way of doing this is to extend the range of adjustment of the differential from 90° to 180°. However, FIG. 1 shows another possibility using the two clutches 2 and 14. When the latter are released, the universal joints 6 and 10 can be turned without driving the input shaft 1 or roller 15. When the joints 6 and 10 are turned through 90° and the clutches 2 and 14 re-engaged, a window cutter which previously acted on the web, for instance, at maximum velocity now acts at minimum speed.

FIG. 2 shows another and very convenient embodiment of the drive according to the present invention, this embodiment differing from the first embodiment in that, instead of two universal joints with a differential in between being used, four universal joints without any differential are used. On the input side there can be seen the input shaft 1 of FIG. 1, shaft 1 driving through clutch 2 the gear 3 meshing with gear 4 which drives through shaft 5 the input universal joint 6. The arrangement on the output side with effect from the universal joint 10 which is disposed on shaft 11 and which drives the roller 15 by way of the two gears 12, 13 and the clutch 14, is the same as in FIG. 1.

Two further universal joints 20, 21 are interposed between the joints 6 and 10, are connected to one another by way of a short shaft 22 and are connected by way of telescopic splined shafts 23, 24 to the universal joints 6 and 10, respectively. All the universal joints are so offset from one another that the planes of adjacent forks intersect one another at right angles. Consequently, the irregularities arising from the discrete universal joints interact entirely in the sense of an amplification. This maximum irregularity position of the universal joints relative to one another is invariable, irregularity being adjusted solely by alteration of the bend angle $\gamma$.

FIG. 2 shows the possible extreme values of the bending angle $\gamma$. With the drive in the solid-line position the bend angles $\gamma$ are at a maximum and the drive provides maximum irregularity. However, in the chain-dotted line position of the drive, the universal joints are coplanar—i.e., the bend angles $\gamma$ have been reduced to zero and so there can be no irregularity. As in the previous embodiment, any intermediate position and, therefore, any intermediate value of irregularity, is possible between the two extreme values of bend angle.

The means for adjustment take the form of a screw-threaded spindle 26 which is operated by a handwheel 25; the spindle 26 acts on the short shaft 22 and enables the same to be adjusted along guides (not shown) to any position between the end positions shown.

The function and operation of the gear pairs 3, 4 and 12, 13 and of the clutches 2 and 14, respectively, are exactly as in the embodiment shown in FIG. 1 and have already been described in connection with the latter embodiment.

While only two embodiments of the present invention have been shown and described, it will be obvious that many changes and modifications may be made thereto without departing from the spirit and scope of the present invention.

What is claimed is:

1. A universal joint arrangement for forming a variable-velocity drive for driving a window cutter roller of an envelope machine, said universal joint arrangement comprising:
    an input to said universal joint arrangement;
    an output from said universal joint arrangement;
    a clutch arranged at each of said input and said output;
    gearwheel pairs at said input and said output providing a ratio stepdown and a ratio stepup respectively, said gearwheel pairs causing the universal joint arrangement to run at half the speed of the window cutter roller;
    a first universal joint connected to said input gearwheel pair;
    a second universal joint connected to said output gearwheel pair; and
    a differential device interconnecting said first and second universal joints at an angle of intersection $\gamma$ to one another so that said first and second universal joints rotate relative to one another.

* * * * *